US012517984B1

(12) United States Patent
Vamvourellis et al.

(10) Patent No.: US 12,517,984 B1
(45) Date of Patent: Jan. 6, 2026

(54) LEARNING CATEGORIZATION WITH NATURAL LANGUAGE PROCESSING NETWORKS

(71) Applicant: BLACKROCK FINANCE, INC., New York, NY (US)

(72) Inventors: Dimitrios Vamvourellis, New York, NY (US); Mate Toth, Budapest (HU); Dhruv Desai, New York, NY (US); Dhagash Mehta, New York, NY (US); Stefano Pasquali, New York, NY (US)

(73) Assignee: BlackRock Finance, Inc., New York, NY (US)

( * ) Notice: Subject to any disclaimer, the term of this patent is extended or adjusted under 35 U.S.C. 154(b) by 160 days.

(21) Appl. No.: 18/347,221

(22) Filed: Jul. 5, 2023

Related U.S. Application Data

(60) Provisional application No. 63/358,431, filed on Jul. 5, 2022.

(51) Int. Cl.
| | |
|---|---|
| *G06F 18/2415* | (2023.01) |
| *G06F 40/284* | (2020.01) |
| *G06F 40/40* | (2020.01) |
| *G06F 40/30* | (2020.01) |
| *G06N 20/00* | (2019.01) |

(52) U.S. Cl.
CPC ........ *G06F 18/2415* (2023.01); *G06F 40/284* (2020.01); *G06F 40/40* (2020.01); *G06F 40/30* (2020.01); *G06N 20/00* (2019.01)

(58) Field of Classification Search
CPC .... G06F 16/353; G06F 18/2415; G06F 40/20; G06F 40/279; G06F 40/284; G06F 40/295; G06F 40/30; G06F 40/40; G06F 40/47; G06F 16/2282; G06F 16/24532; G06F 40/137; G06F 40/169; G06F 40/205; G06N 3/0442; G06N 5/041; G06N 20/00; G06N 5/01; G06Q 50/18; G16H 10/20; H04L 67/104
See application file for complete search history.

(56) References Cited

U.S. PATENT DOCUMENTS

| | | | | |
|---|---|---|---|---|
| 2016/0162456 | A1* | 6/2016 | Munro | G06F 16/24532 704/9 |
| 2019/0206524 | A1* | 7/2019 | Baldwin | G06F 40/169 |
| 2019/0213260 | A1* | 7/2019 | Bacarella | H04L 67/104 |
| 2019/0266270 | A1* | 8/2019 | Van Der Stockt | G06N 5/01 |
| 2020/0125639 | A1* | 4/2020 | Doyle | G06F 40/30 |
| 2021/0117617 | A1* | 4/2021 | Blaya | G06N 20/00 |
| 2022/0129784 | A1* | 4/2022 | Parsons | G06F 40/40 |
| 2022/0207229 | A1* | 6/2022 | Perkins | G06F 40/30 |
| 2022/0399086 | A1* | 12/2022 | Simons | G16H 10/20 |
| 2023/0037077 | A1* | 2/2023 | Gutta | G06F 40/279 |
| 2023/0059494 | A1* | 2/2023 | Hunter | G06F 40/279 |

(Continued)

*Primary Examiner* — Gerald Gauthier
(74) *Attorney, Agent, or Firm* — Haynes and Boone, LLP

(57) ABSTRACT

The embodiments are directed to a system and method for categorizing unstructured data using a machine learning categorization framework with multiple natural language processing (NLP) models. The multiple NLP models in the machine learning categorization framework may be trained using unstructured data associated with a description of an entity and a multiple categories. Once trained, the NLP models are analyzed to determine one or more NLP models that accurately classify data.

20 Claims, 4 Drawing Sheets

(56) References Cited

U.S. PATENT DOCUMENTS

| | | | | |
|---|---|---|---|---|
| 2023/0096857 A1* | 3/2023 | Gutta | G06Q 50/18 | 704/9 |
| 2023/0100508 A1* | 3/2023 | Abobakr | G06F 40/295 | 704/9 |
| 2023/0116515 A1* | 4/2023 | Kanagovi | G06F 40/295 | 704/9 |
| 2023/0130974 A1* | 4/2023 | Yao | G06F 40/20 | 704/9 |
| 2023/0147096 A1* | 5/2023 | Getselevich | G06N 5/041 | 704/9 |
| 2023/0161965 A1* | 5/2023 | Polak | G06F 40/30 | 704/9 |
| 2023/0186025 A1* | 6/2023 | John | G06F 40/40 | 704/9 |
| 2023/0186319 A1* | 6/2023 | Nguyen | G06F 40/47 | 704/9 |
| 2023/0237263 A1* | 7/2023 | Howell | G06F 40/279 | 704/9 |
| 2023/0237512 A1* | 7/2023 | Kaur | G06F 16/353 | 705/7.29 |
| 2023/0281208 A1* | 9/2023 | Nalliakodan | G06F 16/2282 | 707/723 |
| 2023/0281396 A1* | 9/2023 | Shlomov | G06F 40/20 | 704/9 |
| 2023/0316003 A1* | 10/2023 | Friedman | G06N 3/0442 | 704/9 |
| 2023/0325606 A1* | 10/2023 | Mahendravarman | G06F 40/40 | 704/9 |

* cited by examiner

LEARNING CATEGORIZATION WITH NATURAL LANGUAGE PROCESSING NETWORKS

CROSS-REFERENCE TO RELATED APPLICATION

This application claims the benefit of U.S. Provisional Patent Application No. 63/358,431, filed on Jul. 5, 2022, the disclosure of which is incorporated herein in its entirety.

TECHNICAL FIELD

The embodiments relate generally to machine learning systems, and more specifically to a machine learning categorization framework for categorizing unstructured and imbalanced data with natural language processing.

BACKGROUND

Conventional machine learning models perform data classification on structured data. Structured data is data that may be in a standardized format, has a well-defined structure arranged using a predefined data model, has designated fields that may be stored in row and column formats, and is compatible for storage in a database or a database like structure. Unstructured data is data that is not arranged according to a predefined data model, such as data that includes text, messages, video, audio, and the like. Because unstructured data is not arranged accordingly to a predefined data model, unstructured data is difficult to classify. Accordingly, what is needed are machine learning techniques for classifying unstructured data.

Figure 1:
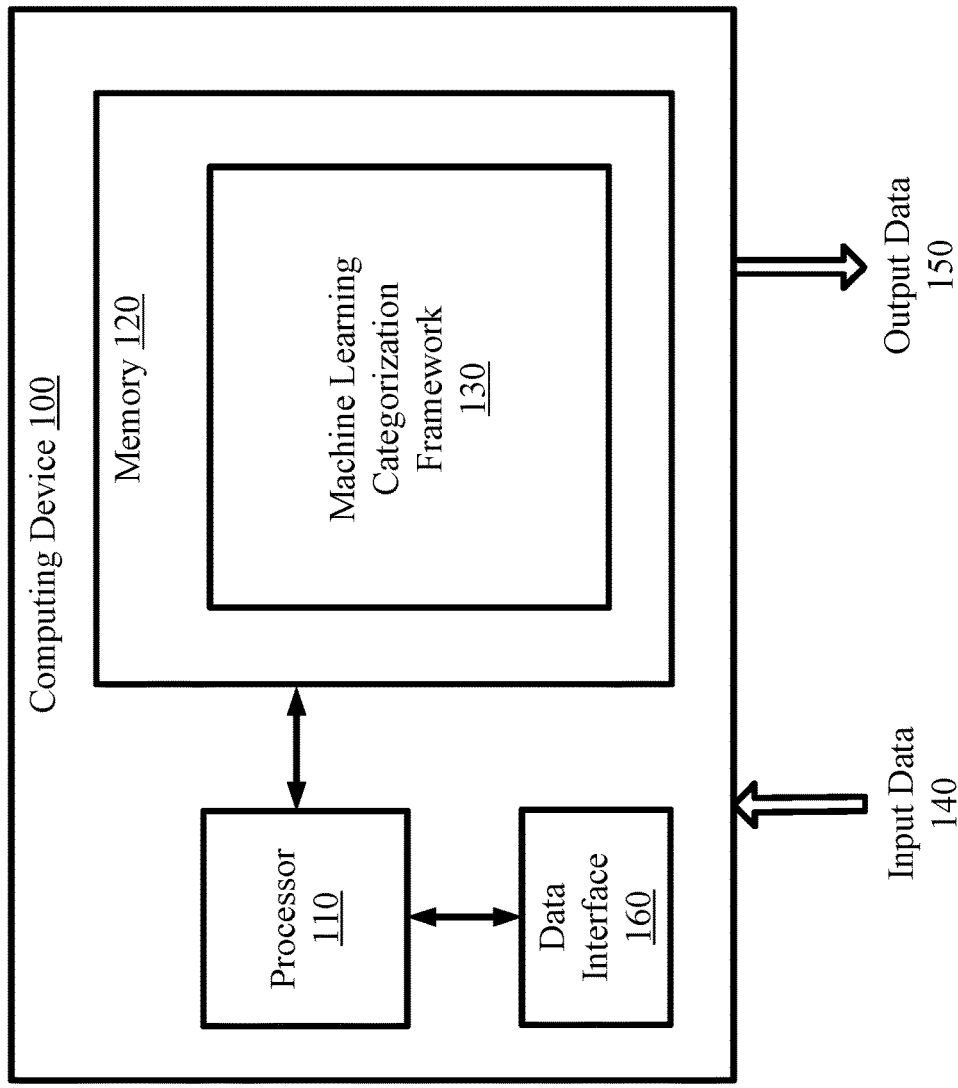
FIG. 1 is a simplified diagram of a computing environment that implements a machine learning categorization framework, according to some embodiments described.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" or "framework" may comprise hardware or software-based components, algorithms, and the like that perform one or more functions. In some embodiments, the module may be implemented on one or more neural networks or specialized hardware for processing artificial intelligence software.

Artificial intelligence implemented with neural networks, machine learning, and deep learning models have demonstrated promise as techniques for automatically analyzing real-world information with human-like accuracy. In general, such neural networks, machine learning models, and deep learning models receive input data and make predictions based on the same. Whereas other approaches to analyzing real-world information may involve hard-coded processes, statistical analysis, and/or the like, neural networks learn to make predictions gradually, through trial and error, in a machine learning process. A given neural network may be trained using a large number of training samples, processing those training samples iteratively until the neural network begins to consistently make similar inferences from the training examples that a human might make. Neural networks have been shown to outperform and/or have the potential to outperform other computing techniques in a number of applications.

The embodiments are directed to a machine learning categorization framework. The machine learning categorization framework may include one or more natural language processing models. During a training phase, the machine learning categorization framework may receive unstructured training data and predefined categories. The machine learning categorization framework may train the one or more natural language processing models to learn to categorize the unstructured training data into one or more predefined categories. Once the machine learning categorization framework is trained, machine learning categorization framework may receive unstructured data and classify the data into the predefined categories.

In some embodiments, an example input data may be unstructured data that includes text. The text may be an investment strategy description for mutual funds, including exchange traded funds (ETFs). The investment strategy description may be a description that is reported to the Securities and Exchange Commission (SEC). The predefined categories may be Lipper Global categories that categorize the exchange traded funds. The text may also include company filings, such as documents filed with the SEC, and the predefined categories may be the Global Industry Classification Standard (GICS) categories. Notably the embodiments are not limited to this type of input data and may be applied to any type of unstructured text data.

Unlike conventional categorization systems, the embodiments categorize unstructured and highly imbalanced data, including data directed to investment strategy descriptions. There are multiple advantages to categorizing such data. First, the machine learning categorization framework may verify the raw unstructured data recorded in the SEC filings. Second, the machine learning categorization framework includes an explainability module that may use Shapley values to determine important features from the unstructured data. These features may identify why a machine learning categorization framework classified a fund to a particular category, as opposed to another category. Third, the machine learning categorization framework may learn the embedded representation of the investment strategy text. The embedded representation of the text may be used to compute various other quantities, such as similarity among funds. This, in turn, may be used as input to other frameworks and/or neural network models for related tasks, such as predicting mutual fund returns. Fourth, once the machine learning categorization framework is trained, the framework may also classify a completely new fund to closely mimic the expert-driven rule-based system. Further embodiments are discussed below.

FIG. 1 is a simplified diagram of a computing environment that implements the machine learning framework, according to some embodiments. As shown in FIG. 1, a computing device 100 includes a processor 110 coupled to a memory 120. Operation of computing device 100 is controlled by processor 110. Although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in or communicatively coupled to computing device 100. Computing device 100 may be implemented as a stand-alone subsystem, as a board added to a computing device, and/or as a virtual machine. Although shown as a single computing device 100, computing device 100 may include multiple computing devices that are communicatively connected by a network.

Memory 120 may be used to store software executed by computing device 100 and/or one or more data structures used during operation of computing device 100. Memory 120 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein.

Further, as shown, memory 120 includes a machine learning categorization framework 130. The machine learning categorization framework 130 may include one or more natural language processing networks that are discussed in further detail below. The machine learning categorization framework 130 may receive input data 140 and generate output data 150. Input data 140 may be unstructured data, such as text or message data, a portion of a document, and the like. Unstructured data may also be highly imbalanced data that may be classified into some classes with higher frequency than into other classes.

During a training stage, the input data 140 may include unstructured text, such as word documents, emails, investment strategy descriptions, and the like. Additionally, input data 140 may include predefined categories of target variables or classes into which machine learning categorization framework 130 may classify the unstructured data. As output data 150, machine learning categorization framework 130 may generate classifications for the input data into one or more predefined categories. Additionally, output data 150 may also include analytics that indicate the accuracy of the one or more natural language processing models included in the machine learning categorization framework 130. Further, output data 150 may include one or more words that machine learning categorization framework 130 identified as being important to classifying the unstructured data.

Once machine learning categorization framework 130 is trained, the machine learning categorization framework 130 may be placed in a real-world environment and enter an inference stage. During an inference stage, the input data 140 may include unstructured text data, such as an investment strategy description for a fund or an ETF, and output data 150 may be a category of the investment strategy description. In some instances, machine learning categorization framework 130 may be periodically trained or fine-tuned during the inference stage as well.

Figure 2:
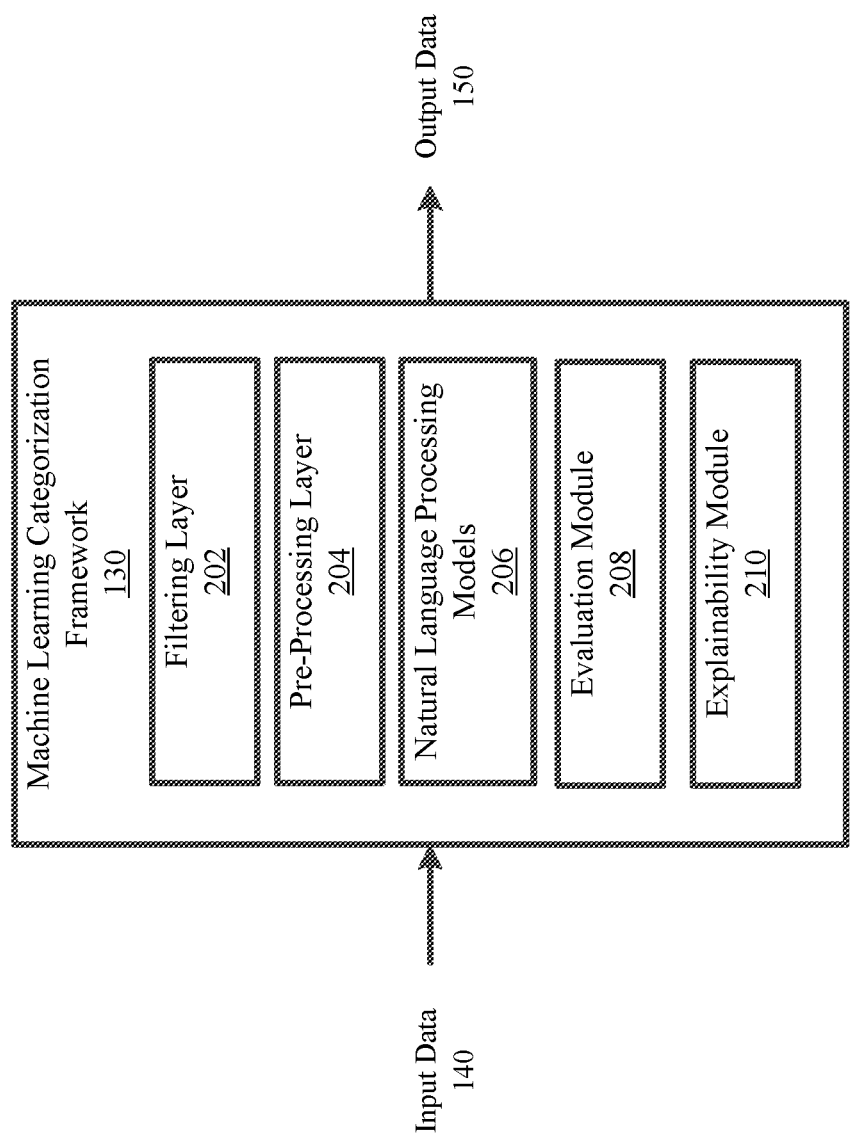
FIG. 2 is a block diagram of a machine learning categorization framework, according to some embodiments.

FIG. 2 is a block diagram 200 of a machine learning categorization framework, according to some embodiments. As discussed above, machine learning categorization framework 130 may receive input data 140 and generate output data 150. Machine learning categorization framework 130 may also include a filtering layer 202, a pre-processing layer 204, and one or more natural language processing (NLP) models 206.

As discussed above, during the training stage, machine learning categorization framework 130 may be trained to classify a fund or an ETF into one or more categories. The input data 140 may be text data, such as data from Lipper Global Data Feed that is associated with the U.S. domiciled open-end mutual funds and ETFs. This text data may include the fund's prospectus which contains its principle investment objective and/or investment strategy. Input data 140 may also include a target variable. The target variable may be a classification system that includes categories or classes. An example target variable may be a Refinitiv Lipper U.S. Fund Classifications system. Refinitiv Lipper may group funds together based on their prospectus-objectives. Refinitiv Lipper classification scheme may be based on Refinitiv Lipper holding's based classification model and granular peer groupings which work in tandem with Refinitiv Lipper's legacy objective. In the Refinitiv Lipper dataset there may be 176 categories or classes.

In some embodiments, the classification system may be highly imbalanced. For example, in the Refinitiv Lipper dataset the least populated class may have four examples and the most populated class may have 396 examples. Further, the Refinitiv Lipper dataset may include 12597 funds. On an average, there were 304 characters for a fund's investment strategy with a standard deviation of 54 characters. As such, during the training stage, the machine learning categorization framework 130 may be trained to categorize funds or ETFs using unstructured data that includes the principle investment objective text and the target variable for classification being the Lipper Global categories with a highly imbalanced dataset.

In some embodiments, to train machine learning categorization framework 130, the input data 140 may be divided into multiple datasets, such as a test dataset, a training dataset, and a validation dataset. For example, a portion of input data 140, e.g., 25% of the data, may be included in a test dataset. The remaining 75% of input data 140 may be divided into a training dataset (e.g., 85% of the remaining 75%) and a validation dataset (e.g., 15% of the remaining 75%). Additionally, because of the imbalanced natured of the dataset, stratified splits may be used to ensure almost identical distribution of the data over all the categories in the training, validation and test datasets as in the original dataset.

In another embodiment, input data 140 may be text data, such as documents that a company files with the SEC, a feed with the company SEC filings, and the like. The text data may include data identifying company activities, assets, summary of the operations, various statements, exposure, and the like. Input data 140 may also be a target variable, such as the Global Industry Classification Standard (GICS®) or another standard for categorizing different companies into sectors, industry groups, industries, subindustries, or other types of categories. The GICS dataset, for example, may provide categories for the text data that include 11 sectors, 25 industry groups, 74 industries, and 163 sub-groups. Similarly to the Refinitiv Lipper dataset, the categories may be highly imbalanced.

Filtering layer 202 may extract certain text data from input data 140 based on text content. For example, filtering layer 202 may extract a self-reported principle investment objectives text for all the funds and ETFs from the prospectus. Example fund objectives may be capital appreciation, income or both. Funds with a capital appreciation objective may primarily invest in assets which are expected to increase in value. Funds with an income objective may primarily invest in securities that produce income, such as bonds paying interest or securities which pay dividends. The text in the prospectus may mention benchmarks or indexes the fund is trying to track, attempting to outperform or at least compare its performance against. Filtering layer 202 may be a machine learning model that recognizes this type of text and extracts the text from input data 140. In some embodiments, filtering layer 202 may be a trained NLP network trained to recognize meaning and content of the text.

Pre-processing layer 204 may perform a sequence of preprocessing steps on the raw text that is included in input data 140 or is an output of filtering layer 202. As discussed above, the output of filtering layer 202 may be text that corresponds to the investment objective descriptions of a fund. Once pre-processing layer 204 receives the raw text, pre-processing layer 204 may performs one or more text preprocessing steps that include tokenization, stop-word filtering, converting text to lowercase, n-gramming, lemmatization, etc. During tokenization, pre-processing layer 204 may convert the strings in the raw text string into a sequence of tokens. For example, pre-processing layer 204 may split the string on non-alphanumeric delimiters, e.g., whitespace or punctuation. Next, pre-processing layer 204 may use stop-word filtering to remove frequent words (e.g. articles, prepositions, and the like) that are not topical and do not carry much information with respect to the classification. Pre-processing layer 204 may also convert the uppercase forms into lowercase given that upper and lowercase word forms are likely to share the same meaning. Pre-processing layer 204 may use n-gramming to understand a certain sequence of n terms, e.g., "machine learning," as a single token. Pre-processing layer 204 may use lemmatization to normalize the words with the same root into a single form. For example, pre-processing layer 204 may change the words such as "housing" and "houses" into a single form "house."

Machine learning categorization framework 130 may include natural language process (NLP) models 206A-G to classify data in the unstructured text, such as funds or ETFs. Example models include a term-frequency and the inverse-document frequency (TF-IDF) model 206A, a Word2Vec model 206B, a Doc2Vec model 206C, a Bidirectional Encoder Representations from Transformers (BERT)-finetuned model 206D, a Sentence-BERT (SBERT) model 206E, a FinBERT model 206F, and Generative Pretrained Transformer (GPT) model 206G. The above models are exemplary and other types of natural language processing models for classifying unstructured data may also be used. Pre-processing layer 204 may make the text data as useful as possible for prediction in the further stages of the prediction pipeline, including text classification using NLP models 206 and feature extraction using explainability module 210. As such, different preprocessing steps may be taken for different types of NLP models 206. For example, for TF-IDF model 206A, pre-processing layer 204 may tokenize text using Spacy's built-in tokenizer. Pre-processing layer 204 may also remove stopwords and non-alphabetic sequences, apply lemmatization using the lemmatizer in Spacy's "en_core_web_lg" model, and apply n-gramming to generate unigrams and bigrams. Given that TF-IDF model 206A may generate high dimensional sparse feature vectors, pre-processing layer 204 may constrain the vocabulary and consequently the dimensionality of the vectors. in another example, for Word2Vec model 206B and Doc2Vec model 206C, pre-processing layer 204 may tokenize text, and convert text to lower case text. In another example, for BERT-finetuned model 206D, pre-processing layer 204 may use a BERT-base-cased tokenizer which tokenizes input text using WordPiece and a vocabulary size of 30,000 tokens. In another example, for specialized BERT models, such as a FinBERT model 206F, pre-processing layer 204 may apply a model-specific tokenizer which is based on a specialized vocabulary, such as FinVocal that is based on the financial vocabulary generated from financial corpora.

TF-IDF model 206A is a natural language processing model that may determine importance of each word in the received text data using a statistical analysis. TF-IDF model 206A may receive text data, e.g., pre-processed text from a document or an investment strategy description from pre-processing layer 204. To determine the importance of each word, TF-IDF model 206A may determine a TF-IDF score for each word in the text and then construct document vectors using the TF-IDF scores. The TF-IDF score is a statistic that measures the relevancy of a word to a document in a corpus. TF-IDF model 206A may construct the TF-IDF score from the term-frequency (TF) and the inverse-document frequency (IDF) statistic as shown in Equations (1)-(3) below:

$$\text{TF-IDF}_{t,d} = \text{TF}_{t,d} \times \text{IDF}_t \quad \text{Equation (1)}$$

$$TF_{t,a} = \frac{n_{t,d}}{n_d} \quad \text{Equation (2)}$$

$$IDF_t = \log_{10}\left(\frac{N}{N_t}\right) \quad \text{Equation (3)}$$

where $n_{t,d}$ is a number of times term t appears in document d, $n_d$ is a total number of terms in document d, $N_t$ is the number of documents that contain the term t and N is the total number of documents in the corpus. This approach reduces an impact of high frequency words, such as "the", "it", and "for", that may appear frequently in the document but may not be informative to classifying data, but may correspond to high word scores.

In some embodiments, the higher the TF-IDF score, the more relevant the word is to the document. The words with the relevant TF-IDF score above a predefined threshold or words that include highest n scores may be combined into a document vector associated with document d. TF-IDF model 206A may classify the text data using the words associated with the TF-IDF scores in the document vector.

The Word2Vec model 206B is a natural language processing model that may receive text data, e.g., pre-processed text from a document or an investment strategy description, from pre-processing layer 104. Word2Vec model 206B may include a neural network model that learns associations between words from a large corpus of text. The neural network may include an embedding layer. The embedding layer may include an n number of layers (where n is an integer) that may generate dense word embeddings in a vector space from one or more words in the text data. The vector space may be several hundred dimensions. The Word2Vec model 206B may be trained in a self-supervised manner on the raw text without human annotation. During training, each unique word in the corpus may be mapped to a corresponding word embedding vector in the vector space. The mapping assumes a distributional hypothesis where words that occur in similar contexts tend to have similar meanings, and may have similar vectors in the vector space. Thus, after Word2Vec model 206B is trained, the word embeddings are positioned in the vector space such that words that are semantically and syntactically similar are located close to one another in a vector space, e.g., have more similar word embedding vectors in the vector space than words that are not semantically and syntactically similar. The learned weights of Word2Vec model 206B classifier represent the embeddings which capture word semantics. The output of Word2Vec model 206B may be a classifier that predicts the class or category associated with the text.

In some embodiments, Word2Vec model 206B may use a continuous bag of words (CBOW) model or skip-gram model. In the CBOW model, Word2Vec model 206B may use a context window to predict a target word, where the context window may have a predefined word or token size. Each word in the context window may be embedded in the embedding space to generate a word embedding vector. From the word embedding vectors, the CBOW model may determine the target word. In the skip-gram model, Word2Vec model 206B may use a target word to predict a context of words. The target word may be embedded into the word embedding vector. From the word embedding vector, skip-gram model may determine the context of words.

Doc2Vec model 206C may be a self-supervised model that creates embeddings for word sequences, such as paragraphs or entire documents. The paragraphs or documents may be the text data generated by the pre-processing layer 204, and may include an investment strategy description. The Doc2vec model 206C may extend the approach in the Word2Vec model 206B to learning a distributed representations of documents. The Doc2Vec model 206C may include an embedding layer that may learn embeddings for words and documents jointly and convert the embeddings into a document embedding vector. Similar to the Word2Vec model 206B, the Doc2Vec model 206C may include one of two types of models for determining document embedding vectors, the distributed-bag-of-words (DboW) model and the distributed memory paragraph vector (DMPV) model.

The DboW model may be analogous to the skip-gram model discussed above. The DboW model may use a document identifier to predict the randomly sampled words from the document. In some embodiments, Doc2Vec model 206C may use a gensim implementation variant of the DboW model with training over 40 epochs, context window size of 15 tokens, and document vector size of 100.

The BERT-finetuned model 206D is a natural language processing model that may receive text data, e.g., preprocessed text from a document or an investment strategy description, from pre-processing layer 104. BERT-finetuned model 206D may be a language model consisting of a stack of multiple transformer blocks. BERT-finetuned model 206D may be based on a BERT-base model though the embodiments may also apply to a BERT-large model.

The BERT-finetuned model 206D may be initially trained in a self-supervised fashion on the task of masked language modeling. For example, BERT-finetuned model 206D maybe trained on large amounts of unlabeled text data. During a training stage of the BERT-finetuned model 206D, a certain percentage of tokens (e.g., 15% of the tokens) of each sentence in the training set may be randomly masked. A token may be a word in a sentence. BERT-finetuned model 206D includes one or more encoder layers in the transformer layer. A softmax layer over the vocabulary size may be stacked on top of the last encoder layer. A first encoder layer may receive a sentence that includes masked and unmasked words. The encoding layers in the transformer layer may encode the words into encodings. The softmax layer and the transformer layer may be trained together to predict the masked words in the sentence from the encodings. In some embodiments, the BERT-finetuned model 206D may be further pre-trained on the task of next sentence prediction, in which the BERT-finetuned model 206D may be fed with two sentences and is trained to predict whether the second sentence actually follows the first sentence.

The first token of a sequence fed into the BERT model may have a special classification token, such as the [CLS] token. The final hidden state corresponding to this token may be used as the aggregate representation of the entire sequence for classification tasks.

Next, BERT-finetuned model 206D may be finetuned for a specific task, such as text classification, including fund or ETF classification. An example task may be predicting predefined fund categories, e.g., Lipper Global categories, using the fund description as the input text. Specifically, the BERT-finetuned model 206D may include a softmax layer of n dimensions, where n corresponds to a number of categories. For example, softmax layer may include 94 dimensions that are equal to the number of distinct Lipper Global categories. The softmax layer may be stacked on top of the encoding layers in the pretrained BERT-base model.

In some instances, fine-tuning a BERT-base model on a new task may cause the model to forget the information learned from the language modeling task in the process of adapting to the new task, also known as "catastrophic forgetting." To minimize catastrophic forgetting, a gradual unfreezing during finetuning may be applied to the BERT-finetuned model 206D. In this case, all layers apart from the softmax layer are frozen. The BERT-finetuned model 206D may then be trained for a number of epochs, e.g., 15 epochs using a high learning rate of 0.01, a mini-batch size of 16 and a maximum sequence length of 75 tokens. Next all layers are unfrozen and the entire model may further be trained for another number of epochs, e.g., 5 epochs using a smaller learning rate of 2e-5 to reduce the likelihood that the base layers forget the basic language information while focusing on this classification task. In some embodiments, the BERT-finetuned model 206D may be finetuned on a n1-highmem-32 GCP instance with 2 TESLA T4 GPUs, 32 CPUs and 208 GB of host memory. The 20-epoch finetuning routine may be completed within approximately 21 minutes using the aforementioned machine configuration.

SBERT model 206E may be a modification of the BERT-base model which uses siamese and triplet network architecture to derive semantically meaningful sentence embeddings, setting a new state-of-the-art performance on semantic similarity tasks. SBERT model 206E may test the quality of pre-trained sentence embeddings on a classification task. SBERT model 206E may be finetuned using the MiniLM-L12-H384-uncased model as abase and then finetuned further on one billion sentence pairs on the task of semantic similarity. Using SBERT model 206E, each fund description may be mapped to an n-dimensional vector space, e.g., 384 dimensional dense vector space. These embeddings may be used as features to train a logistic regression classifier to predict fund categories, e.g., Lipper Global categories.

FinBERT model 206F may be a finance domain-specific BERT model. FinBERT model 206F may be based on the BERT-base model that is finetuned using an original masked language modeling technique on a large financial corpus of financial data, such as 4.9 billion tokens consisting of SEC corporate filings, earnings transcripts and analyst reports. Using the FinBERT model 206F as a base, a similar fine-tuning procedure as the one described for the BERT-fine-tuned model 206D above may be applied. The FinBERT model 206F may then be further trained on a classification task, such as classifying funds into one or more Lipper Global categories or one or more GICS categories. The same training parameters and machine configuration as the ones discussed above for the BERT-finetuned model 206D may also be used to train the FinBERT model 206F. The 20-epoch finetuning routine may be completed within approximately 19 minutes in some embodiments.

GPT model 206G may be a GPT-n model, such as a GPT-3, GPT-3.5, GPT-4 model or another GPT model variant. GPT model 206G may be a large language model that implements a deep neural network architecture with pre-trained transformer model and an attention layer that focuses on segments of input text that may be the most relevant segments.

In some embodiments, the vectorization models, such as TF-IDF model 206A, Word2Vec model 206B, Doc2Vec model 206C, and SBERT model 206E may be used as features for a multinomial logistic regression fit to Lipper Global categories as the target variable. For the logistic regression, the "L2" regularization may be applied with the penalty parameter tuned on a validation set with grid-search.

During an inference stage, e.g., once machine learning categorization framework 130 is trained, machine learning categorization framework 130 may receive input data 140 that is unstructured data, such as text data that includes an investment strategy as reported to the SEC. Input data 140 may pass through filtering layer 202 and pre-processing layer 204. NLP models 206A-G may receive the pre-processed text data from pre-processing layer 204. Using the text data, each of NLP models 206A-G may classify the text data into one or more categories. Machine learning categorization framework 130 may output the one or more categories for the text data as output data 150.

In some embodiments, machine learning categorization framework 130 may include an evaluation module 208. Evaluation module 208 may use various metrics to evaluate the performance of NLP models 206A-G. Example evaluation metrics may include a weighted accuracy metric, a weighted F1 score metric, an AUC-ROC metric, and a top-k accuracy metric among others. Evaluation module 208 may evaluate the accuracy of NLP models 206A-G predicting a target variable from a highly imbalanced dataset consisting of multiple classes.

The weighted accuracy metric may define accuracy as a fraction of predictions that NLP models 206A-G predicted correctly. For multi-class classification problems, the weighted accuracy may be determined as follows:

$$\text{accuracy}(y, \hat{y}) = \sum_{j=1}^{C} w_j \sum_{i=1}^{n} 1(\hat{y}_i = y_i) \qquad \text{Equation (4)}$$

where $1(x)$ is the indicator function, C is the number of classes, $w_i$ is the weight assigned to the i-th class such that $\sum_{i=1}^{C} w_i = 1$, $\hat{y}_i$ is the predicted value of i-th sample, $y_i$ is the corresponding true value, n is the total number of data points, and i is an integer. Evaluation module 208 may use a weighted accuracy metric to evaluate each model in NLP models 206A-G. The results of the evaluation are illustrated in Table 1, below.

The weighted F1 score metric may define the unweighted F1 score as follows:

$$\frac{2(\text{Precision} \times \text{Recall})}{\text{Precision} + \text{Recall}} \qquad \text{Equation (5)}$$

where "Precision" is TP/(TP+FP) and "Recall" is (TP/(TP+FN), TP is the number of true positives, FP is the number of false positives, and FN is the number of false negatives. Since the learning task is a multi-class classification problem, evaluation module 208 may use a micro F1 score and a macro F1 score. The micro F1 score may favor all the classes equally. The macro F1 score may determine the F1 score for each label and then determine the unweighted sum of the labels. Evaluation module 208 may use the weighted F1 score metric to evaluate each model in NLP models 206A-G. The results of the evaluation are illustrated in Table 1, below.

The AUC-ROC metric may use a receiver-operating-characteristic (ROC) curve that is a plot which may yield a performance of a binary classifier system as a function of the probability discrimination threshold. The curve is generated by plotting a fraction of a true positive rate (TPR) versus a fraction of false positive rate (FPR). The area under the ROC curve (AUC-ROC) is the probability that a classifier may rank a randomly chosen positive instance higher than a randomly chosen negative instance. In a multi-class classification problem, evaluation module 208 may use a one versus the rest strategy where evaluation module 208 may determine an average of the AUC-ROC for each class against all other classes. Alternatively, evaluation module 208 may use a one versus one strategy that averages a pairwise AUC-ROC. Evaluation module 208 may use a micro and macro versions of the AUC-ROC to take into account the imbalanced-ness of the dataset. Evaluation module 208 may use the AUC-ROC metric to evaluate each model in NLP models 206A-G. The results of the evaluation are illustrated in Table 1, below.

The top-k accuracy metric may generate a top-k accuracy score. The top-k accuracy score may generalize the usual accuracy score. For example, each of NLP models 206A-G may predict probabilities for a data-point to belong to each class. Typically, each one of NLP models 206A-G determines that the class with the highest probability among all probabilities is the predicted class for the data point. However, for multi-class problems, the classes with consecutive probabilities in descending order may also be worth considering. In particular, for the top-k accuracy score, a prediction is considered correct if the ground truth label is among the k highest predicted probabilities. In some embodiments, the top-k accuracy score may be computed as follows:

$$\text{top} - k \text{ accuracy}(y, \hat{y}) = \frac{1}{n} \sum_{i=1}^{n-1} \sum_{j=1}^{k} 1(\hat{y}_{i,j} = y_i), \qquad \text{Equation (6)}$$

where $\hat{y}_{i,j}$, is the predicted class for the i-th data point corresponding to the j-th largest predicted probability score. Evaluation module 208 may use the top-k accuracy metric to evaluate each model in NLP models 206A-G. The results of the evaluation are illustrated in Table 1, below.

The confusion matrix metric may be a matrix M where the element $M_{ij}$ is equal to the number of data points that belong to the i-th class but are predicted to be in the j-th class by one of NLP models 206A-G. The elements of matrix M may be normalized by the sum of each row. Evaluation module 208 may use the confusion matrix metric to evaluate each model in NLP models 206A-G.

Table 1 below, summarizes results for predicting classifications for funds and/or ETFs on out-of-sample data by NLP models 206A-G discussed above. As illustrated in Table 1, the evaluation module 208 determined that the BERT-finetuned model 206D outperforms models 206A-C and 206E-F based on various metrics:

TABLE 1

| Model | Top-k Accuracy | | | | F1-Score | | AUC | |
| --- | --- | --- | --- | --- | --- | --- | --- | --- |
| | k = 1 | k = 2 | k = 3 | k = 4 | Micro | Weighted | Micro | Weighted |
| BERT-finetuned | 0.745 | 0.856 | 0.900 | 0.923 | 0.740 | 0.744 | 0.994 | 0.986 |
| TF-IDF + LR | 0.670 | 0.805 | 0.851 | 0.875 | 0.670 | 0.659 | 0.984 | 0.973 |
| Word2Vec + LR | 0.608 | 0.758 | 0.820 | 0.851 | 0.608 | 0.601 | 0.985 | 0.969 |
| Doc2Vec + LR | 0.495 | 0.671 | 0.745 | 0.789 | 0.496 | 0.474 | 0.976 | 0.942 |
| SBERT + ER | 0.680 | 0.813 | 0.868 | 0.897 | 0.680 | 0.666 | 0.990 | 0.977 |
| FinBERT | 0.744 | 0.856 | 0.897 | 0.922 | 0.738 | 0.744 | 0.993 | 0.986 |

The results demonstrate the effectiveness of transfer learning and the use of pre-trained language models for a downstream task, which in this case is text-based classification, such as fund and/or ETF classification. BERT-finetuned model 206D, which may be based on a general-purpose BERT model achieves state-of-the-art performance after being finetuned on a training set of approximately 8000 data points for 20 extra epochs, using the knowledge learned from the massive corpora that the BER-base model was pre-trained on. On the contrary, the document embeddings learned from scratch using the Doc2Vec model were not descriptive enough for predicting fund labels. This is explained given a small size of the training set which does not allow for learning a descriptive document representation.

Evaluation module 208 also determined that document embeddings created through the word vector averaging using the pre-trained Word2Vec 206B model yielded significant improvements over Doc2Vec model 206C. This highlights that leveraging pre-trained models (either directly as features or through finetuning) is beneficial when applying semantic representations on small datasets. Aside from the BERT-based models, such as models 206D-F, TF-IDF model 206A performed best, outperforming both Doc2Vec model 206C and pre-trained Word2Vec model 206B. This is likely due to the presence of certain words or bigrams that could be highly indicative of particular funds and which are captured directly as features using a local representation in TF-IDF model 206A. Individual terms might not be captured as well using Word2Vec model 206B averaging and Doc2vec model 206C, as these models create distributed representations of the entire document. Using BERT-finetuned model 206D, however, terms relevant to the classification task via its fine-tuning mechanism may be upweighted.

One significant advantage of BERT-finetuned model 206D is that the BERT-base model transformer layer and the softmax classification layer may be finetuned at the same time, thus optimizing the entire BERT-finetuned model 206D and FinBERT model 206F end-to-end for a given task. In other words, by supervising BERT-finetuned model 206D and FinBERT model 206F using labels from the training set, the hidden layers of the BERT-finetuned model 206D and FinBERT model 206F may be optimized and then used to extract features which are particularly useful for the classification task. SBERT model 206E, TF-IDF model 206A, and Doc2Vec model 206C, on the other hand, are trained sequentially, where NLP may first extract features. Next these features may be used to fit a logistic regression classifier to perform a classification task. As a result, the feature extraction is not supervised by the labels in NLP models 206A, 206C, and 206F as in BERT-finetuned model 206D and FinBERT model 206F, which results in a significantly lower performance.

Finally, as indicated by the micro F1-score in Table 1 which takes class imbalance into account, BERT-finetuned model 206D maintains the highest performance both for the high-frequency and low-frequency classes. Also, as illustrated by the top-k accuracy metric in Table 1, BERT-finetuned model 206D predicts the fund label with approximately 75% accuracy for k=1, and with approximately 86% accuracy for the cases where the true label is one of two classes with the highest predicted probability, as indicated by the top-k accuracy metric with k=2.

Table 1 also illustrates that using a domain-specific BERT-base model may not further improve performance. As discussed above, FinBERT model 206F, for example, was further pre-trained on a financial domain-specific corpus, e.g., the SEC corporate filings. As shown in Table 1, evaluation module 208 determined that FinBERT model 206F achieves almost identical performance to BERT-finetuned model 206D. This illustrates that BERT-finetuned model 206D may adapt after a couple of training epochs to the specific language, e.g., the language of the financial corpus, learning the features which are particularly useful for the classification task.

In some embodiments, machine learning categorization framework 130 may select one or more NLP models 206A-G to processes the unstructured data during the inference stage based on the accuracy of NLP models 206A-G as determined by evaluation module 208 and based on computing capabilities, such as available memory and processing power.

Conventionally the interpretable models are favored in various fields where model explainability is crucial for downstream decision making. The superior performance of complex models with millions of parameters, such as BERT models and BERT model variants, may justify using complex models in real-world applications over simpler, more interpretable models. To interpret complex models, machine learning categorization framework 130 includes an explainability module 210. Explainability module 210 may identify features, e.g., words, which drive decisions in BERT-finetuned model 206D. Explainability module 210 may also uncover limitations that cause BERT-finetuned model 206D to generate systematic errors.

In some embodiments, explainability module 210 may include a "partition explainer." The "partition explainer" may be included in the SHAP packages and may be based on Shapley values. The Shapley values may provide a model-agnostic method to interpret machine learning model predictions, such as predictions made by NLP models 206A-G. The Shapley value may be equal to a contribution of a feature to the final prediction. The Shapley values for all features may add up to the final prediction for a given data point. In the NLP setting, the Shapley value is the contribution of each token in the input sentence to the one of NLP model 206A-G's prediction, in this case the log-odds of each Lipper category class. Each sentence that is an input to one of NLP models 206A-G may be a set of tokens F, where each token is a word. For each token i in the set of tokens F, explainability module 210 may compute a marginal contribution of token i to the model output function v for all subsets S in tokens F that exclude token i. The marginal contribution may be equal to a difference between the model output with token i and the model output without appending token i to subsets S. Shapley value for token i is the weighted marginal contribution over all subsets S, where greater weights are given to subsets that are close to either the initial set of tokens or the empty set. The Shapley value for token i may be defined as:

$$\phi_i(v, F) = \sum_{S \subseteq F - \{i\}} \frac{|S|!(|F| - |S| - 1)!}{|F|!} [v(S \cup \{i\}) - v(S)] \quad (6)$$

To compute the Shapley value for token i in a sentence with |F| tokens, $2^{|F|}$ number of computations may be performed. Because the number of computations is not tractable as the length of the input text increases, the "partition explainer" may use values which approximate Shapley values by reducing the number of subsets on which the marginal contributions for each token are computed. In some embodiments, explainability module 210 may determine the marginal contributions based unions of tokens that respect the order of words in the original sentence.

Using the values that approximate Shapley values, the change in the log-odds of a given class may be attributed to each token of the input text, e.g., the fund description. Hence, explainability module 210 may determine local explanations based on the approximate value of each word in the input text, e.g., a given fund description of the test set, and determine the words each model in NLP models 206A-G mostly attends to when making the final prediction. Explainability module 210 may determine a sum the approximate values from all test points for each class to generate global explanations. The tokens with the highest value sums may be the words which increase the log-odds for the class across the whole test dataset, and in turn are the words which are the most important features for the class.

Table 2, below, summarizes results generated using explainability module 210. As discussed above, explainability module 210 determines a value of each token in the input text, e.g., the fund description, in the test dataset for each unique class. The value is a measure of local importance of a token in classifying a specific piece of input text. Explainability module 210 may determine a sum of each token in the vocabulary over the entire test set. Table 2 display words that correspond to the five highest values sums over the test dataset for twelve sample classes. Accordingly, even though NLP models, such as BERT-finetuned model 206D, may not classify text based solely on the presence or absence of a given word, explainability module 210 identifies one or more words that might increase the predicted probability of a given class and patterns which explain the decision mechanism of NLP models 206A-G.

TABLE 2

| EQUITY US | EQUITY US SM & MIDCAP | EQUITY SECTOR INFO TECH | EQUITY EM MKTS GLOBAL |
|---|---|---|---|
| 1000 | Russell | technology | emerging |
| equity | 2000 | Technology | market |
| 500 | — | Global | markets |
| stocks | companies | infrastructure | erging |
| growth | small | internet | em |

| BOND USD MUNICIPAL | BOND USD MEDIUM TERM | BOND USD SHORT TERM | MONEY MARKET USD |
|---|---|---|---|
| Municipal | Bloomberg | Bloomberg | liquid |
| Federal | Barclays | Barclays | ity |
| tax | bonds | 3 | preservation |
| municipal | debt | debt | Treasury |
| preservation | gate | 1 | level |

| BOND USD HIGH YIELD | ALTERNATIVE OTHER | EQUITY SECTOR REAL EST | LOAN PARTICIPATION FUNDS |
|---|---|---|---|
| high | seeks | estate | loans |
| seeks | AC | real | current |
| High | World | Estate | floating |
| Yi | Trust | trusts | debt |
| eld | options | Real | senior |

For example, for class "Equity US", tokens that are "1000" and "500" have high importance because these tokens correspond to the top five values. This is because most U.S. Equity funds are benchmarked against S&P 500 or Russell 1000 index. Thus, given that the benchmark is mentioned in the fund description, BERT-finetuned model 206D learned how to take the benchmark into account when classifying a fund as "Equity US". Table 2 also indicates that BERT-finetuned model 206D attributes higher importance to words which are descriptive of the given class and do not occur often in examples of other classes, e.g. "emerging" for Equity Emerging Mkts Global class, "technology" for Equity Sector Information Tech class, and "municipal" for Bond USD Municipal class.

Figure 3:
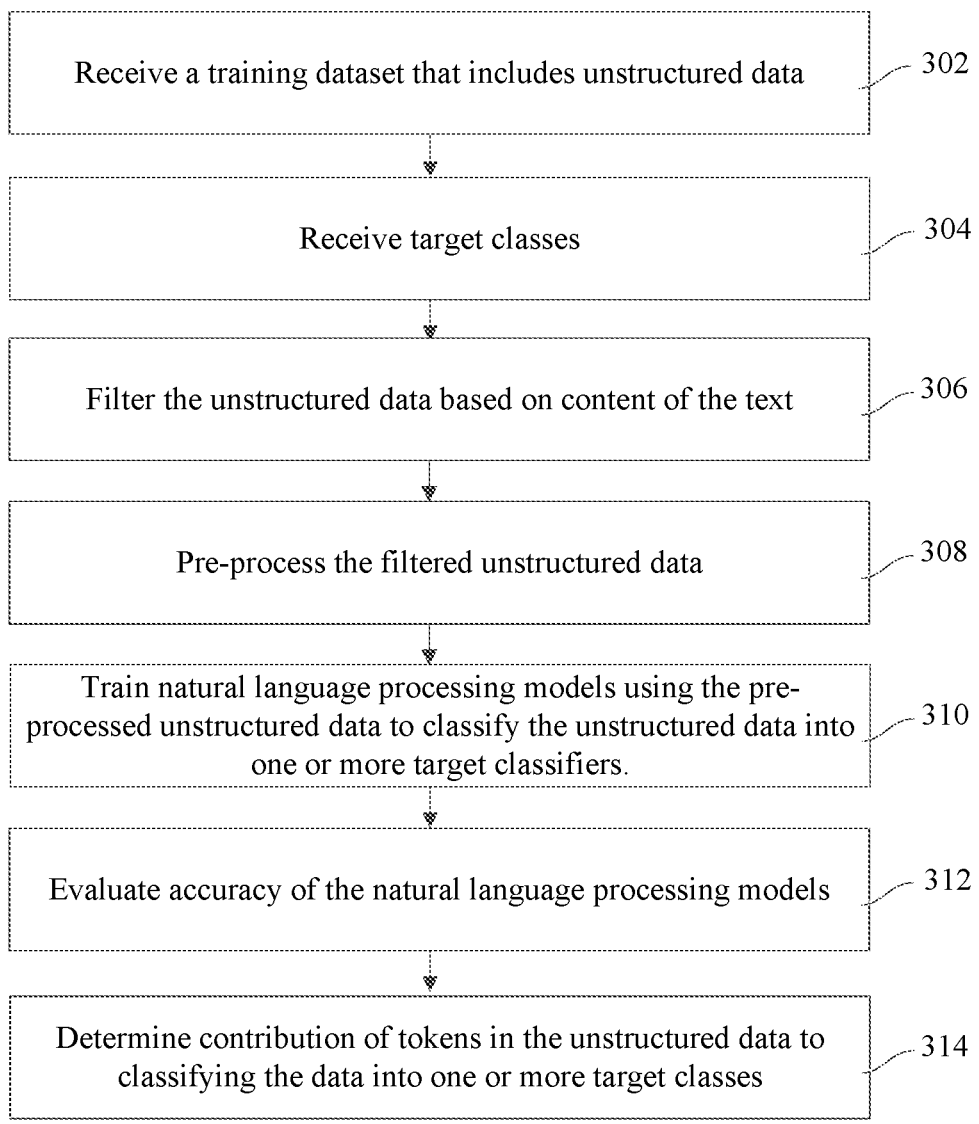
FIG. 3 is a flowchart of a method for training a machine learning categorization framework to classify unstructured data, according to some embodiments.

FIG. 3 is a flowchart of a method 300 for training machine learning categorization framework to classify unstructured data, according to some embodiments. One or more of the processes 302-314 of method 300 may be implemented, at least in part, in the form of executable code stored on a non-transitory, tangible, machine-readable media that when run by one or more processors may cause the one or more processors to perform one or more of the processes 302-314.

At process 302, a training dataset is received. For example, machine learning categorization framework 130 may receive input data 140 that includes a training dataset comprising unstructured text data. Example unstructured text data may include messages, emails, fund or ETF investment strategy descriptions, prospectuses, company filings, and the like.

At process 304, target classes are received. For example, machine learning categorization framework 130 may receive input data 140 that includes target classes. During the training stage, the machine learning categorization framework 130 may learn to classify the unstructured text data received in process 302 into one or more target classes. In some instances, machine learning framework 130 may learn to classify data into a number of classes and identify the likelihood that the data may be in a particular class, such as 80% in the first class, 18% in the second class, and 2% in the remaining classes.

At process 306, unstructured text data is filtered. For example, filtering layer 202 may recognize content and extract certain text data from input data 140 based on content. Example content may be text associated with the principle investment objectives in the prospectus. In some embodiments, process 306 may be optional.

At process 308, unstructured text data is pre-processed. For example, pre-processing layer 204 may receive text data that is received in process 302 and/or filtered in processes 306. Pre-processing layer 204 may further divide text data into tokens, filter stop-word and remove frequent words such as articles, prepositions, and the like, converting text to lowercase, and n-gram and lemmatize text.

At process 310, natural language models are trained using the pre-processed text and target classes. For example, NLP models 206A-G may receive text pre-processed in process 308 and target classes received in process 306 and learn to classify the text into one or more of the target classes. The training of each model in NLP models 206A-G may be specific to the model. In some embodiments, NLP models 206A-G may learn to classify funds or ETFs into classes based on the investment objectives.

At process 312, natural language models are evaluated. For example, evaluation module 208 may evaluate the accuracy of each model in NLP models 206A-G in classifying text data using different metrics. Based on the accuracy, evaluation module 208 may also generate a graph or a table on a display of a computing device which visually indicates the accuracy of each one of NLP models 206A-G. Evaluation module 208 may also recommend certain models to classify certain types of unstructured data.

At process 314, contribution of tokens to the classification is determined. For example, for complex models, such as BERT-finetuned model 206D and GPT model 206G, explainability module 210 may perform analytics, including determining Shapley values for different tokens in the text, that identify tokens that contribute to BERT-finetuned model 206D and GPT model 206G classifying the text into one target class as opposed to another class.

Figure 4:
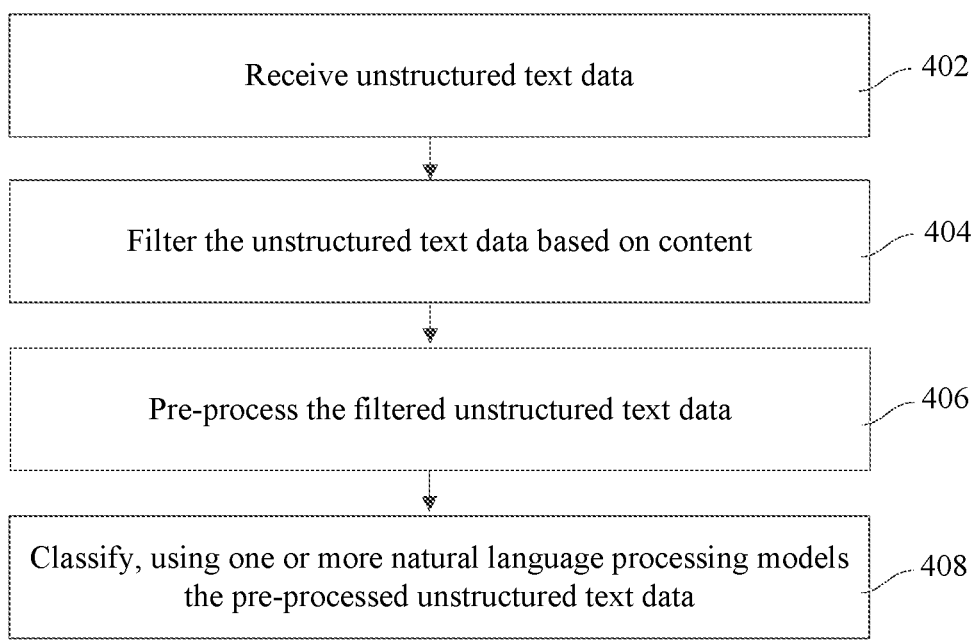
FIG. 4 is a flowchart of a method for classifying unstructured data, according to some embodiments.

FIG. 4 is a flowchart of a method 400 for classifying unstructured data, according to some embodiments. One or more of the processes 402-408 of method 400 may be implemented, at least in part, in the form of executable code stored on a non-transitory, tangible, machine-readable media that when run by one or more processors may cause the one or more processors to perform one or more of the processes 402-408.

At process 402, unstructured text data is received. For example, machine learning categorization framework 130 may receive input data 140 that includes unstructured text data. Example unstructured text data may include messages, emails, fund or ETF investment strategy descriptions, and the like.

At process 404, unstructured text data is filtered. For example, filtering layer 202 may recognize content and extract certain text data from the unstructured text data based on the content. An example content may be text associated with the principle investment objectives in the prospectus. In this example, principle investment objectives may be filtered from the prospectus that includes an investment strategy description.

At process 406, unstructured text data is pre-processed. For example, pre-processing layer 204 may receive the unstructured data that was received in process 402 and/or filtered in processes 404. Pre-processing layer 204 may further divide text data into tokens, filter stop-word and remove frequent words such as articles, prepositions, and the like, convert text to lowercase, n-gram and lemmatize text.

At process 408, unstructured data is classified with one or more natural language models. For example, one or more of NLP models 206A-G may receive unstructured data filtered in process 404 and/or pre-processed in process 406 and generate a classification for the unstructured text data. For example, one or more of NLP models 206A-G may receive principle investment objectives in the prospectus of a fund or ETF as the pre-processed unstructured data and classify the unstructured data into one of the Lipper Global categories. In another example, one or more NLP models 206A-G may receive text that includes company filings, such as SEC filing, as unstructured data and classify the unstructured data into one of the GICS classes. Additionally, NLP models 206A-G may also identify the likelihood of the unstructured data belonging in the one or more classes.

Going back to FIG. 1, in some embodiments, computing device 100 may include a data interface 160. Data interface 160 may comprise a communication interface, a user interface, such as a voice input interface, a graphical user interface, and/or the like. Data interface 160 may display the output of the NLP models 206A-G, including classifications for the unstructured text, such as a prospectus or the company filings on a display of a computing device 100. As discussed above, the classifications may be one or more Lipper Global categories or GICS categories, the output of the evaluation module 208, and/or the output of the explainability module 210. In some instances, data interface 160 may also display multiple classifications for the unstructured text and the corresponding probabilities of the unstructured text corresponding to a particular classification. The data interface 160 may further receive input that may configure the number of categories that may be displayed to the corresponding unstructured text, such as the top k categories, categories with a probability value above a predefined threshold, and the like.

Some examples of computing devices, such as computing device 100 may include non-transitory, tangible, machine readable media that include executable code that when run by one or more processors (e.g., processor 110) may cause the one or more processors to perform the processes of various methods. Some common forms of machine-readable media that may include the processes are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
    providing to a machine learning categorization framework executing on a processor, a training dataset comprising an unstructured text;
    providing a plurality of target classes associated with the unstructured text, wherein the unstructured text is classified into one or more target classes in the plurality of target classes; and
    training, using the unstructured text and the plurality of target classes, each of a plurality of natural language processing models in the machine learning categorization framework to classify the training dataset comprising the unstructured text into the plurality of target classes, wherein the training further comprises:
    finetuning a Bidirectional Encoder Representations from Transformers (BERT) model in the plurality of natural language processing models to perform a classification task on the unstructured text using the plurality of target classes, such that dimensions of a softmax layer of the BERT model correspond to a number of the plurality of target classes.

2. The method of claim 1, further comprising:
    identifying content in the unstructured text;
    extracting text from the unstructured text that corresponds to the identified content; and
    wherein training the plurality of natural language processing models further comprises training the plurality of natural language processing models using the extracted text.

3. The method of claim 1, further comprising:
    performing a plurality of preprocessing steps on the unstructured text, wherein the plurality of preprocessing steps are different for a first natural language processing model and a second natural language processing model in the plurality of natural language processing models.

4. The method of claim 1, wherein the finetuning further comprises training the softmax layer and a transformer layer in the BERT model to classify the plurality of target classes.

5. The method of claim 1, wherein the training dataset further comprises the unstructured text from a domain-specific corpus.

6. The method of claim 1, wherein the unstructured text is associated with a prospectuses of a plurality of funds.

7. The method of claim 1, further comprising:
    determining accuracy of the plurality of natural language processing models using a plurality of metrics; and
    selecting at least one natural language processing model from the plurality of natural language processing models based on the determined accuracy.

8. The method of claim 1, further comprising:
    determining contribution of each token in the unstructured text for classifying the unstructured text into one of the plurality of target classes.

9. A system, comprising:
    a memory; and
    a processor coupled to the memory and configured to execute instructions that cause the system to perform operations, the operations comprising:
    providing, to a machine learning categorization framework, a training dataset comprising an unstructured text, wherein the unstructured text is an imbalanced text that is classified in one target class more than in other target classes in a plurality of target classes by at least a factor of ten;
    providing the plurality of target classes associated with the unstructured text; and
    training, using the unstructured text and the plurality of target classes, each of a plurality of natural language processing models in the machine learning categorization framework to classify the training dataset comprising the unstructured text into the plurality of target classes, wherein the training further comprises:
    finetuning a Bidirectional Encoder Representations from Transformers (BERT) model in the plurality of natural language processing models to perform a classification task on the unstructured text using the plurality of target classes, such that dimensions of a softmax layer of the BERT model correspond to a number of the plurality of target classes.

10. The system of claim 9, wherein the instructions are further configured to perform operations comprising:
    extracting text from the unstructured text that corresponds to a specific content; and
    wherein training the plurality of natural language processing models further comprises training the plurality of natural language processing models using the extracted text.

11. The system of claim 9, wherein the instructions are further configured to perform operations comprising:
    performing a preprocessing step on the unstructured text, wherein the preprocessing step is different for a first natural language processing model and a second natural language processing model in the plurality of natural language processing models.

12. The system of claim 9, wherein the instructions are further configured to perform operations comprising:
   training the softmax layer and a transformer layer in the BERT model in parallel to classify the plurality of target classes.

13. The system of claim 9, wherein the training dataset comprises the unstructured text from a domain-specific corpus.

14. The system of claim 9, wherein the instructions are further configured to perform operations comprising:
   determining accuracy of the plurality of natural language processing models using a plurality of metrics; and
   selecting at least one natural language processing model from the plurality of natural language processing models based on the determined accuracy.

15. The system of claim 9, wherein the instructions are further configured to perform operations comprising:
   determining contribution of each token in the unstructured text for classifying the unstructured text into one of the plurality of target classes.

16. A non-transitory computer readable medium storing instructions thereon, that when executed by a processor cause the processor to perform operations, the operations comprising:
   receiving, at a machine learning categorization framework, a training dataset comprising an unstructured text comprising a strategy prospectus, wherein a plurality of natural language processing models in the machine learning categorization framework are trained to classify the unstructured text into a plurality of target classes, and wherein a Bidirectional Encoder Representations from Transformers (BERT) model in the plurality of natural language processing models is finetuned to perform a classification task on the unstructured text using the plurality of target classes, such that dimensions of a softmax layer of the BERT model correspond to a number of the plurality of target classes; and
   classify, using the plurality of the natural language processing models, the strategy prospectus into at least one category in the plurality of target classes.

17. The non-transitory computer readable medium of claim 16, further comprising:
   identifying content in the strategy prospectus;
   extracting text from the strategy prospectus that corresponds to the identified content; and
   wherein classifying the strategy prospectus further comprises classifying the extracted text using the plurality of natural language processing models.

18. The non-transitory computer readable medium of claim 16, further comprising:
   performing a plurality of preprocessing steps on the unstructured text, wherein the plurality of preprocessing steps are different for a first natural language processing model and a second natural language processing model in the plurality of natural language processing models.

19. The non-transitory computer readable medium of claim 16, further comprising:
   determining at least one token in the strategy prospectus that a BERT model in the plurality of natural language processing models uses to classify the strategy prospectus.

20. The non-transitory computer readable medium of claim 16, further comprising:
   determining contribution of each token in the unstructured text for classifying the unstructured text into one of the plurality of target classes.

* * * * *